United States Patent [19]

Seegmiller

[11] Patent Number: 4,650,373
[45] Date of Patent: Mar. 17, 1987

[54] ROCK BOLT CONSTRUCTION AND INSTALLATION

[76] Inventor: Ben L. Seegmiller, 3500 Loren Von Dr., Salt Lake City, Utah 84124

[21] Appl. No.: 797,935

[22] Filed: Nov. 14, 1985

[51] Int. Cl.$^4$ .................. E21D 21/00; E21D 20/02
[52] U.S. Cl. .................... 405/260; 405/259; 411/512; 411/61; 411/452; 411/478
[58] Field of Search ............ 405/259, 260; 411/479, 411/478, 477, 446, 447, 451–456, 19, 512, 516, 520, 61

[56] References Cited

U.S. PATENT DOCUMENTS

| | | | |
|---|---|---|---|
| 141,810 | 8/1873 | Nichols | 411/478 |
| 2,157,216 | 5/1939 | Pollard | 411/479 X |
| 2,412,517 | 12/1946 | Klein | 411/452 |
| 2,754,716 | 7/1956 | Bourns | 411/479 |
| 3,653,217 | 4/1972 | Williams | 405/259 |
| 4,012,913 | 3/1977 | Scott | 405/259 |
| 4,098,087 | 7/1978 | Swain | 405/259 |
| 4,284,379 | 8/1981 | Chaiko | 405/259 |

FOREIGN PATENT DOCUMENTS

| | | | |
|---|---|---|---|
| 1069159 | 2/1954 | France | 411/452 |
| 601643 | 7/1978 | Switzerland | 405/259 |

*Primary Examiner*—Dennis L. Taylor
*Attorney, Agent, or Firm*—M. Ralph Shaffer

[57] ABSTRACT

An elongate hollow rock structure and installation wherein the elongated shank of the bolt is hollow and has a series of outwardly bowed side or side portions that are capable of resilient deflection. Fin means are provided in sides or side portion, with the overall span of the fin means being greater than the bolt hole into which the bolt is to be impacted. The pin means are tapered so as to provide for ease of insertin of the bolt. Impaction of the bolt into a mine roof hole provides for a compression loading of the fins of the bolt shank such that these engage the aperture wall in a forced-compression state. Corrosion factors are limited to fin edge contact with the aperture wall of the bolt hole. Resilient sides' deformation at the core of the bolt shank is relied upon to compression load the fins for frictional contact with the aperture wall into which the bolt is implaced.

7 Claims, 10 Drawing Figures

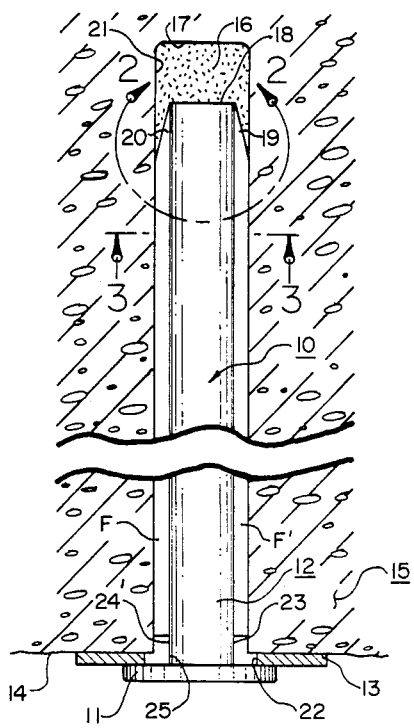
FIG. 1
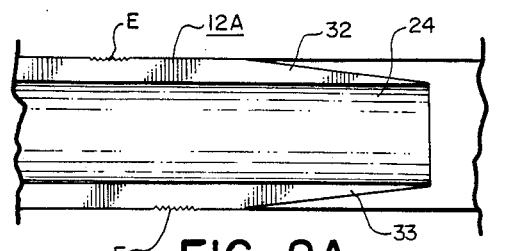
FIG. 2A
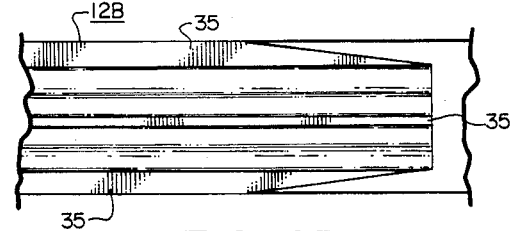
FIG. 2B
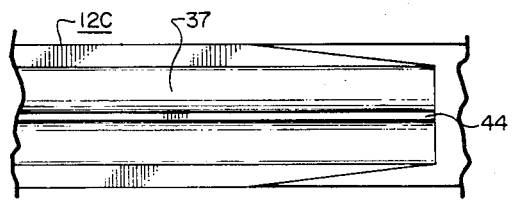
FIG. 2C
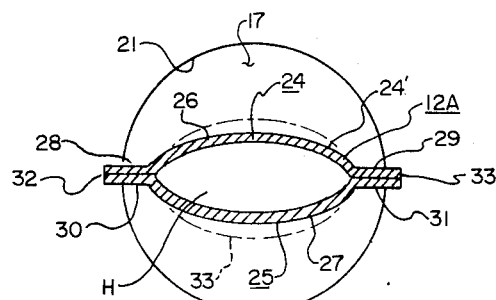
FIG. 3A1
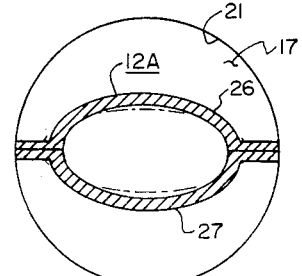
FIG. 3A2
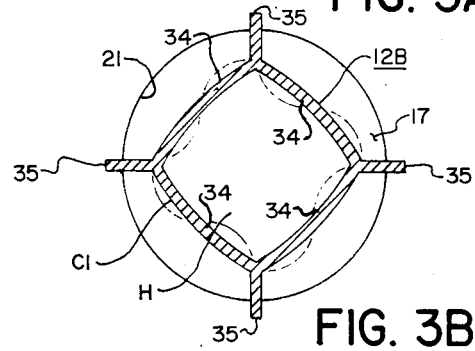
FIG. 3B1
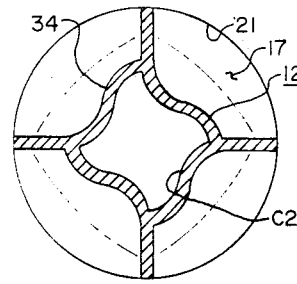
FIG. 3B2
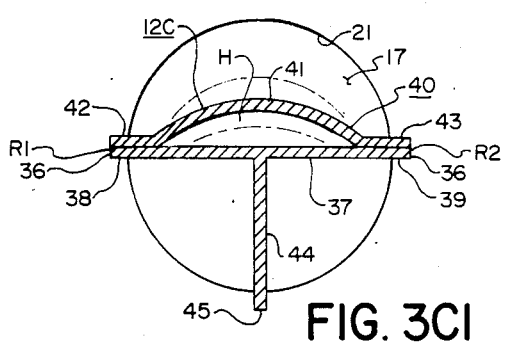
FIG. 3C1
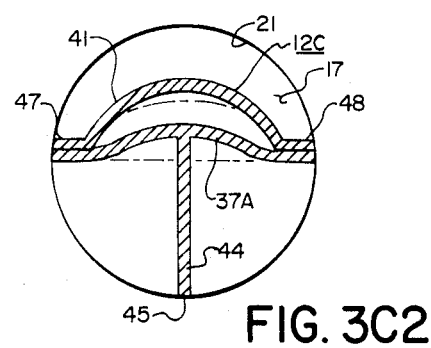
FIG. 3C2

ROCK BOLT CONSTRUCTION AND INSTALLATION

FIELD OF INVENTION

The present invention relates to rock bolts and installations thereof, and, more particularly, provides a mine roof bolt that is designed to minimize corrosive effects yet provide for compressive installation through the employment of fins and resilient supporting structure. Such supporting structure in general is nominally bowed outwardly, the fin span being greater than the nominal diameter of the mine roof aperture in which the bolt is to be installed. The fin means are tapered so as to provide ease of insertion for the bolt. When the insertion is begun and then continued, the fins displace inwardly so as to increase, in general, the bowed effect of the core of the bolt, the latter serving to load compression-wise the fins so as to provide for a pressure contact by the fins against the hole wall.

DESCRIPTION OF PRIOR ART

In the past there have been many types of mine bolts that have been fabricated for use in mine roof installations. Some of the "bolts" simply comprise reinforcing bars that are cut to length and appropriately headed through use of any one or a variety of measures. Recently there has been developed certain transverse configurements as to the shank of the bolt so that there is a compression-loading of the bolt within the hole provided for bolt insertion. Transverse cross-sections will resemble either and "S" or a "C". Thus, upon bolt installation, are compressed slightly so that a pressure contact exists as between the wall of the aperture and the "S" legs of the cross-section, or the "C" circumference which tends to close the gap in the "C". Problems occur here since possible corrosive effects are substantially maximized, owing to the unusually large contact area between the bolt and the hole wall. What is needed is to reduce corrosive effects to a bare minimum and yet compression-load the contact structure of the bolt with the aperture wall of the hole in which the bolt is to be implaced.

BRIEF DESCRIPTION OF PRESENT INVENTION

According to the present invention, a rock bolt comprises an elongate member having a headed end. The shank of the elongate member which is joined to the headed end has a cross-section of varying configurements, all having a common feature of a bowed side or side portion. In one embodiment another side which is flat is joined to the bowed sidestrip. In other embodiments there are outwardly bowed sides joined together or made integral and having edge margins or separate portions constituting fins that proceed radially outwardly from the core of the bolt shank that is composed of the bowed sides. Likewise, all of the embodiments contemplate the employment of a rock bolt the transverse span of which, relative to fin edges, will be slightly greater, i.e., of the order of approximately one-eighth of an inch by way of example, than the diameter of the hole or aperture in the mine formation in which the bolt is to be impacted and implaced. The fins or fin means of the bolts are tapered proximate the remote end of the bolt. Thus, when the bolt is forced through the hole the core is resiliently deformed such that the bowed sides will change, resiliently their configuration and thus serve both to restrict slightly the outer transverse dimension of the bolt and at the same time load, compressively, the outwardly directed fins so that these will pressure-contact the sides of the aperture wall in which the bolt is placed. Contact of the bolt with the aperture wall will be largely restricted to the fin edges, thus reducing corrosive effects as might otherwise obtain through the chemical composition of the strata. The outwardly bowed nature of one or more sides of the bolt shank core effects, in addition to the material employed, the resilience needed and flexure desired to accommodate inward movement of the fins, upon bolt insertion, and the compression-loading supplied to and by the fins in the installation.

OBJECTS

Accordingly, it is an object of the present invention to provide a new and useful rock bolt.

It is a further object of the invention to provide a roof bolt for mines which, by the incorporation of fins or fin means, will encounter minimum corrosive effects as might be contributed by the chemical condition of the structure or formation in which the bolt is to be implaced.

A further object of the invention is to provide a rock bolt having a series of fins, the edges of which will be conpression loaded upon installation of the roof bolt, this to increase the retentive hold of the rock bolt installation; this compression loading is produced through an augmentation or production of resilient arcuate or curved portions that pre-load the fins upon forced reduction of inter-fin span.

An additional object is to provide usable rock bolts with multiple fin constructions and a central core backing the fins, the central core being composed of bowed sides or side portions which can be resiliently deformed so as to compression load the fins against the wall aperture within which the bolt is to be implaced.

BRIEF DESCRIPTION OF THE DRAWINGS

The present invention may best be understood by reference to the following description, taken in connection with the accompanying drawings in which:

FIG. 1 is a fragmentary view, principally in section, of a rock bolt constructed in accordance with the principles of the present invention.

FIGS. 2A, 2B, and 2C are enlarged fragmentary details, taken along the arcuate line 2—2 in FIG. 1, illustrating three respective embodiments of a rock bolt incorporating a differing shank, cross-sectional configurement.

FIGS. 3A1, 3B1, and 3C1 correspond to FIGS. 2A, 2B, and 2C, respectively, are transverse horizontal sections taken along the line 3—3 in FIG. 1, and illustrate three representative shank cross-sections that can be utilized in connection with the fabrication of the bolt shank; the fin means are shown in a nominal position as slightly overlapping the hole within which the bolt is to be implaced.

FIGS. 3A2, 3B2, and 3C2 correspond to FIGS. 3A1, 3B1, and 3C1, respectively, and illustrate these respective cross-sections as they are resiliently deformed, through bolt implacement, such that the fins are compression-loaded within the mine roof hole and the cores are resiliently deflected so as to provide adequate compression-loading to the fins in their pressured and frictional engagement with the wall of the hole of the installation.

DETAILED DESCRIPTION OF PREFERRED EMBODIMENTS

In FIG. 1 rock bolt 10 is shown to include a headed end 11 and also, projecting upwardly therefrom, an elongate shank 12. It is seen that headed end 11 secures bearing plate 13 against the underside 14 of mine roof structure or formation 15. Shank 12 is hollow, both for deflection purposes as hereinafter explained, and additionally, to provide for the grouting, by grout 16, of the rock bolt within aperture 17, both interior and exterior of the fins of shank 12 which will later be explained. The bolt is shown to include a series of fins F and F' which are tapered, at the remote end 18 of the bolt, at tapered areas 19 and 20. These fins are compressed inwardly, as will hereinafter be explained, to friction-and-pressure contact the aperture wall 21 of aperture 16. The bearing plate 13 includes a medial aperture 22 accommodating the bolt shank. The bolt itself may be recessed at the fin areas at 23 and 24 as may be desired.

Of special importance are the cross-sectional embodiments as shown in FIGS. 3A1, 3B1, and 3C1. It is noted that as to FIG. 3A1 firstly, that side members 24 and 25 have outwardly curved side portions 26 and 27 as well as edge margins 28, 29 and also 30, 31. These edge margins are joined together as by welding and conjointly form opposite fins 32 and 33. It is noted that the outer extremities of these fins overlap the cross-sectional circumference of aperture 17, namely, at its aperture wall 21. The combined cross-section of the shank is hollow as shown at H. It is to be noted, of course, that when the bolt is impact-thrust into aperture at hole 17, then the central bowed portions 26 and 27 will bow outwardly to the phantom line configurements, respectively, at 24' and 33.

Accordingly, as to the embodiments shown in FIGS. 2A and 3A1, the elongate shank is termed as shank 12A. FIG. 3A2 illustrates the deformation of the cross-section of FIG. 3A1 when the bolt is thrust into the hole such that the fins 32 and 33 frictionally abut under pressure engagement the inner wall 21 of aperture 17. It is this condition that is likewise shown in FIG. 2A. Note is to be made as to all of the embodiments, of which FIG. 2A is representative, that the outermost edges E may be serrated, relative to the fins, so as to further increase the pressured frictional contact of the fin edges with the bore wall at 21.

Another configuration of the bolt shank is shown at 12B in FIGS. 3B1 and 2B. Fins 35 proceed radially outwardly from and are integral with the core C1 of the bolt shank. Such core is made up of a series of outwardly convex sides 34 and are resiliently flexible or deformable. The core is hollow at each so as to provide for such flexure and additionally provide a passageway for grouting purposes. The span of the cross-section is seen to overlap the side wall 21 of aperture 17; however, when the bolt is impact-thrust into aperture 17 and formation 15 then the edges of the fins are forced inwardly so as to resiliently distort, as by way of compound-curves, for example, the several flexure sides 34. The flexure of such sides 34 of the bolt shank will serve to generate compression forces as to the fins to force these outwardly in contact with aperture wall 21. All of this is seen in FIG. 3B2.

A preferred embodiment of the invention as to the cross-sectional configuration of the bolt shank is seen in FIG. 2C and FIG. 3C1. In this particular embodiment and elongate side member 40 is shown to include an outwardly convex, bowed side portion 41 relative to this new bolt shank 12C. A flat side plate 37 is also included, and the opposite edge margins 38 and 39 thereof are joined as by welding to edge margins 42 and 43 associated with the bowed portion 41. Thus, edges 36 of the fins formed at R1 and R2 by these joined, opposite edge margins, are seen to overlap the cross-section of dimension of aperture 17 at its cylindrical wall 21.

In operation, and similarly to that shown in connection with FIGS. 3A1-3A2, and FIGS. 3B1, 3B2, the fin edges are thrust inwardly upon impact-insertion of the bolt into the hole such that the flat plate 37 now becomes inwardly deformed, having a curvature as indicated at 37A. The fin 44, integral with such flat side plate, is now compressed inwardly and yet held frictionally outwardly against the wall by virtue of the resilient nature of curved portion 37A. The bowed portion 41 becomes increasingly bowed, having a shortened radius of curvature as see in FIG. 3C2. Accordingly, the resilient nature of side 41 and side plate 37 contribute an outward thrusting not only to the fin extremities at R1 and R2 but also to extremity 45 of rib or fin 44.

In all of the embodiments of the invention it is to be noted that the fins or ribs at 32, 35, and 37 in FIGS. 2A, 2B, and 2C, respectively, and by way of example, will be tapered as seen, for example, at tapered portions 32, 33 in FIG. 2A. Thus the mine roof bolts, whatever their shank configurations as illustrated by way of example in the several figures following FIG. 1 do provide for ease of insertion of mine roof bolts having slightly oversized shanks such that the inward-forcing of the fins is enabled by the flexure of the core sides; the latter in turn supplied compressive forces to the fins against the surfaces which they frictionally and pressure-engage.

Of course, all of the fins or ribs provided the respective cores can be serrated to increase frictional effect and augmented holding power; note serrations E.

The invention, indeed, will embrace all types of rock bolts having hollow cores wherein the flexure feature is provided for compression-loading the fins.

As to the type of material that can be used for the bolt shank, one type is a general purpose, high-strength, low alloy steel, with an intermediate carbon content. Certain specifications provide for steels having yield points of approximately 60,000 psi and tensile strength of approximately 75,000 psi. Other materials can be used so long as there is the resilient flexure requisite in permitting a slight deformation of the shank sides so as to produce the compressive forces above referred to.

Finally, the mine bolt can be grouted in place by introducing grout into the hollow central portion of the shank, through an opened apertured headed end of the bolt, and allowing the grout to proceed through the end and then back through and between the fins.

While it is contemplated that the principal usage of the rock bolt construction will be as a mine roof bolt, it will be understood, from use of the generic term "rock bolt", that the same can be used in mine ribs and floors, underground caves, tunnels, storage vaults, and other rock formations, and toxic waste repositories, underground power stations, or other caverns, and so forth.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A rock bolt including, in combination: a headed end; an elongate, hollow shank integral with and extending from said headed end and including a remote end from said headed end, said shank having plural, elongate, interconnected, laterally resilient, inwardly deformable sides provided with elongate, outwardly extending fin means extending longitudinally along said sides for frictionally engaging the wall of an external, undersized formation aperture having a diameter less than the span of said fins, whereby resilient deflection in said sides as produced through thrusting of said bolt into said aperture and the consequent inner movement of said fin means produces compressive inner movement of said fin means whereby to provide pressured contact of said fin means with said wall of said aperture, said fin means having outer edges parallel to the axis of said shank but being progressively tapered inwardly solely proximate said remote end.

2. The structure of claim 1 wherein said shank comprises mutually opposite side members respectively having side-opposite edge margins spanned by respective transversely outwardly bowed resilient side portions comprising said sides, corresponding ones of said side edge margins being joined together and forming oppositely disposed ones of said fin means.

3. The structure of claim 1 wherein said shank includes plural, outwardly bowed interconnected resilient side portions as said sides, said fin means projecting radially outwardly from said side portions.

4. The structure of claim 1 wherein said shank includes plural, outwardly bowed interconnected resilient side portions as said sides and constructed for transverse, compound-curve resilient deflection, said fin means projecting radially outwardly from said side portions.

5. The sturcture of claim 1 wherein said shank comprises an elongate, essentially flat strip having opposite edge margins and also an outwardly bowed opposite side member likewise having opposite edge margins in correspondence with said edge margins of said flat strip, corresponding ones of said edge margins of said flat strip and said side member being secured together and conjointly forming said fin means, said flat strip having an outwardly directed, inwardly urgeable outer fin also forming one of said fin means, said shank being constructed such that, when said shank is impacted into a diameter-undersized formation aperture said flat strip will bow resiliently inwardly, under the radial inner urging of said fin its contact with said formation at said aperture, and said side member will bow increasingly and resiliently outwardly.

6. The structure of claim 2 wherein said side portions are provided with outwardly directed fins comprising additional ones of said fin means.

7. In combination: a rock formation having a lower surface and an aperture proceeding upwardly from said lower surface and defined by an aperture wall; a bearing plate disposed against said lower surface and having a medial aperture aligned with said aperture wall; a headed mine roof bolt having a head retaining said bearing plate and also a diametrically oversized radially resilient hollow shank of uniform radial cross-section extending upwardly from said head and impact-forced into said aperture, said shank having straight-sided fin means, having parallel edges and tapered solely at their insert extremities, compression-forced against said aperture wall and resilient flexure-deformable resilient sides compression-force backing said fin means; and grout means disposed through said shank to proceed about the end thereof and set exterior of said shank against said aperture wall and between said fin means.

* * * * *